United States Patent Office 2,724,707
Patented Nov. 22, 1955

2,724,707

ELASTIC SYNTHETIC RUBBER COMPOSITION AND METHOD OF MAKING SAME

Harold P. Brown, Akron, Ohio, assignor to The B. F. Goodrich Company, New York, N. Y., a corporation of New York No Drawing. Application November 1, 1950,
Serial No. 193,521

24 Claims. (Cl. 260—80.7)

The present invention relates generally to synthetic rubber compositions and their manufacture, and is particularly concerned with elastic synthetic rubber compositions having a novel combination of properties among which are exceptionally high tensile strength in the pure gum or unreinforced condition and the ability to remain flexible at extremely low temperatures.

The synthetic rubbers heretofore known to the art have particular properties and attributes fitting them to particular uses. However, they are deficient in certain other properties and this prevents their wider use. For example, none of the commercial synthetic rubbers can be used to produce pure gum (unreinforced) vulcanizates having the high strength and "snappiness" possessed by pure gum vulcanizates of natural rubber. Such materials also lose their flexibility at moderately low temperatures. The combination of high tensile strength in the pure gum condition and good low temperature flexibility has not heretofore been observed even in experimental rubbery materials. Polybutadiene-1,3 is perhaps the most flexible at low temperatures of the known synthetic rubbers yet it seldom exhibits a tensile strength above 300 to 500 lbs./sq. in. when vulcanized in a pure gum recipe in the substantial absence of reinforcing agents.

In addition, the known rubber-like materials, both natural and synthetic, are often possessed of certain other deficiencies including relatively poor ozone resistance and poor resistance to sunlight, water and the elements.

I now provide, by this invention, elastic synthetic rubber compositions having a novel and unique combination of properties in that they possess tensile strengths of several thousand lbs./sq. in. without reinforcement, low temperature flexibility of the order of that of vulcanized polybutadiene, unusual resistance to ozone, water, sunlight, acids, bases and other powerful deleterious influences, as well as other desirable properties. These compositions are unlike conventional synthetic rubber vulcanizates in that they are polymeric metallo-carboxylates produced by a polymeric condensation reaction or condensation polymerization involving salt formation between (1) the carboxy groups of a rubbery polymer of an open chain conjugated diene polymer containing combined carboxyl groups in its polymer structure and (2) the metallic cation of a polyvalent metallic oxide. In other words they may be thought of as possessing a three-dimensional cross-linked structure in which linear conjugated diene polymer chains are connected to each other by a plurality of primary valence units of the structure

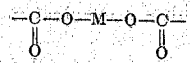

M being a polyvalent metallic atom, to form larger polymeric molecules.

The production of these elastic synthetic rubber compositions, in accordance with my invention, is effected by a multistep process as follows:

A. Preparing a plastic, conjugated diene polymer containing a controlled amount of combined free carboxyl groups, B. Admixing the plastic workable polymer with a polyvalent metal oxide, and C. Heating the resulting plastic composition until the salt-forming polymeric condensation reaction has occurred and the mixture has been converted from an essentially plastic condition to an essentially strong, elastic, non-plastic condition.

Step A in the process may be carried out in various ways differing considerably one from the other but all designed to produce a plastic workable polymer of an open-chain conjugated diene which polymer contains a controllable quantity of combined carboxyl groups. One method, particularly described in the present application, involves the polymerization in an acidic aqueous medium of a monomeric mixure containing an open-chain, aliphatic conjugated diene and a controlled amount of an olefinically-unsaturated carboxylic acid. This method is of especial importance to those who operate their own synthetic rubber producing facilities and has the advantage of providing maximum flexibility, by proper choice of polymerization materials and conditions, in the nature and characteristics of the carboxy-containing polymer used in Steps B and C.

Another method of operation in Step A of the process involves the reaction of a carboxylating agent or carboxyl-supplying reagent such as maleic acid or anhydride or a mercapto carboxylic acid such as thioglycollic acid or an anhydride thereof, with a plastic polymer of an open-chain aliphatic conjugated diene polymer (preferably a polymer of a butadiene-1,3 hydrocarbon) not containing combined carboxyl groups, in the presence of a peroxygen catalyst, thereby to produce, by addition of the carboxyl-supplying reagent to some of the double bonds of the reacting polymer, a plastic rubbery polymer containing combined carboxyl groups. This method is of importance to those who have no polymerization facilities yet desire to secure the advantages of this invention starting with the commercially-available diene polymers (which contain no combined free carboxyl groups), and is described in greater detail in my copending application Serial No. 193,522, filed November 1, 1950.

Still a third method of operation in Step A of the process, also of importance to those who have no polymerization facilities, involves the reaction with a hydrolyzing agent of a plastic rubbery interpolymer of an open-chain aliphatic conjugated diene (preferably a butadiene-1,3 hydrocarbon) with an unsaturated copolymerizable material containing a group hydrolyzable to a carboxyl group, such as an unsaturated nitrile (acrylonitrile, for example), ester (an alkyl acrylate or alkacrylate, for example) or amide (acrylamide, for example) thereby to hydrolyze a portion of the hydrolyzable groups and produce a plastic rubbery polymer containing combined carboxyl (—COOH) groups. This third method is described in greater detail in my copending related application, Serial No. 193,523, filed November 1, 1950.

In the production of the polymers in Step A according to the present invention a monomeric mixture is polymerized in an acidic aqueous medium comprising, as essential ingredients, at least 50% by weight of an open-chain, aliphatic conjugated diene such as butadiene-1,3 and equal or lesser amounts of one or more of the olefinically-unsaturated carboxylic acids. Other monomeric materials are not essentially present in the monomeric mixture but, as explained hereinbelow, may be present, if desired.

The open-chain, aliphatic conjugated dienes suitable for use in the monomeric mixture include the butadiene-1,3 hydrocarbons such as butadiene-1,3 itself, 2-methyl butadiene-1,3 (isoprene), 2,3-dimethyl butadiene-1,3, piperylene, 2-neopentyl butadiene-1,3, and other hydrocarbon homologs of butadiene-1,3 and in addition the substituted dienes such as 2-chloro butadiene-1,3, 2- cyano butadiene-1,3, the straight chain conjugated pentadienes, the straight- and branch-chain conjugated hexadienes and others. The butadiene-1,3 hydrocarbons and butadiene-1,3 in particular, because of their ability to produce stronger and more desirable polymers are much preferred.

The olefinically-unsaturated carboxylic acids which are polymerized with an open-chain, aliphatic diene in Step A of the process are characterized by possessing one or more olefinic carbon-to-carbon double bonds and one or more carboxyl groups, that is, monocarboxy and polycarboxy, monoolefinic and polyolefinic acids including, for example, such widely divergent materials as acrylic acid, the alpha-alkyl acrylic acids, crotonic acid, beta-acryloxy propionic acid, alpha- and beta-vinyl acrylic acid, alpha-beta-isopropylidene propionic acid, sorbic acid, cinnamic acid, maleic acid, oleic acid, undecylenic acid, ricinoleic acid, linoleic acid, linolenic acid and others.

Better results are obtained by the utilization of one or more olefinically-unsaturated carboxylic acids containing at least one activated olefinic carbon-to-carbon double bond, that is, an acid containing an olefinic double bond which readily functions in an addition polymerization reaction because of the olefinic double bond being present in the monomer molecule either in the alpha-beta position with respect to a carboxyl group thusly $$\overset{H}{-C}=\overset{H}{C}-COOH$$

or attached to a terminal methylene grouping thusly $CH_2=C<$. In the alpha-beta unsaturated carboxylic acids the close proximity of the strongly polar carboxyl group to the double-bonded carbon atoms has a strong activating influence rendering the substances containing this structure very readily polymerizable. Likewise, when an olefinic double bond is present attached to a terminal methylene group, the methylenic hydrogen atoms are very reactive making the double bonded carbon atoms readily enter into polymerization reactions.

Illustrative alpha-beta unsaturated carboxylic acids within the above-described preferred class include maleic acid, fumaric acid, crotonic acid, alpha-butyl crotonic acid, angelic acid, hydrosorbic acid, cinnamic acid, m-chloro cinnamic acid, p-chloro cinnamic acid, umbellic acid, beta-benzal acrylic acid, beta-methyl acrylic acid (isocrotonic acid or 2-butenoic acid) and other monoolefinic monocarboxylic acids; sorbic acid, alpha-methyl sorbic acid, alpha-ethyl sorbic acid, alpha-chloro sorbic acid, alpha-bromo sorbic acid, beta-chloro sorbic acid, alpha-, beta-, or gamma-, epsilon-dimethyl sorbic acid, alpha-methyl-gamma-benzal crotonic acid, beta-(2-butene) acrylic acid (2,4-heptadiene-oic-1), 2,4-pentadienoic acid, 2,4,6-octatrienoic acid, 2,4,6,8-decatetrienoic acid, 1-carboxy-1-ethyl-4-phenyl butadiene-1,3, 2,6-dimethyl decatriene-(2,6,8)-oic-10, alpha-beta-isopropylidene propionic acid having the structure

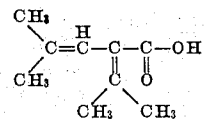

alpha-vinyl cinnamic acid, alpha-isopropenyl-furfural acetic acid, alpha-isopropenyl-cinnamenyl acrylic acid, and other polyolefinic monocarboxylic acids; hydromuconic acid, glutaconic acid, and other monoolefinic polycarboxylic acids; 3-carboxy-pentadiene-(2,4)-oic-1, muconic acid, and other polyolefinic polycarboxylic acids.

Olefinically unsaturated carboxylic acids containing the $CH_2=C<$ grouping include acrylic acid, alpha-chloro acrylic acid, methacrylic acid, ethacrylic acid, alpha-isopropylidene acrylic acid, alpha-styryl acrylic acid (2-carboxy-4-phenyl butadiene-1,3), beta-vinyl acrylic acid (1-carboxy-butadiene-1,3), alpha-vinyl acrylic acid, beta-acryloxy propionic acid, beta-acryloxy acetic acid, and others.

Best polymers are obtained in Step A by interpolymerizing with a diene a monoolefinic monocarboxylic acid having its olefinic double bond in alpha-beta position to the carboxyl group and also containing a terminal methylene group, such as the acrylic acids including acrylic acid, ethacrylic acid and the like, and other acids of this structure listed above.

The proportions of the essential monomeric materials in the monomeric mixture may be varied according to the type of polymer desired. It has been discovered that replacement of butadiene in the polymer by as little as 1.0% interpolymerized acid produces a polymer which when elasto-condensed with a metallic oxide produces a polymeric metallo-carboxylate possessed of a tensile strength from 200 to 1,000 lbs./sq. in. higher than similarly cured polybutadiene. As the amount of olefinically-unsaturated acid in the monomeric mixture (and consequently in the polymer) is increased the tensile strength of the polymeric metallo-carboxylate obtained therefrom is increased but the ease of working of the unvulcanized polymer is decreased. It is therefore preferred, for obtaining plastic easily-worked rubbery materials, to employ monomer mixtures containing in the range of 1 to 30% by weight of the acid component. When only the diene and the acid are interpolymerized this means, of course, that the proportion of the former will be in the range of 70 to 99% by weight.

The proportions of monomeric materials in the total monomeric mixture will vary also depending on the acid used for some unsaturated acids inhibit the polymerization of butadiene hydrocarbon while others accelerate it. For example, acrylic acid inhibits the polymerization of butadiene so that the proportion of combined acid in the polymer is usually less than its proportion in the monomeric mixture. Methacrylic acid, on the other hand, enters the polymer with relatively greater ease than acrylic acid and consequently the proportion of combined or interpolymerized acid is usually as great or greater than its proportion in the total monomeric mixture. For these reasons, relatively greater amounts of acrylic acid than methacrylic acid have to be charged during polymerization. By proper selection of the proportions of acidic monomers of different combining rates the distribution of the carboxyl content of the polymers may be controlled. Thus, a mixture of acrylic acid and methacrylic acid gives a better distribution than the use of either acid alone.

A more precise manner of defining the polymers for use in Step B of this invention is in terms of their combined acid content. Since the percentage of acid in the total monomeric mixture does not indicate the carboxyl content of the interpolymer obtained, the latter will be defined herein in terms of chemical equivalents of carboxyl (—COOH) per 100 parts by weight of polymer rubber and will be sometimes referred to by the designation e. p. h. r. ("equivalents per hundred rubber"). The latter value is easily determined, for example, by titration of a polymer solution with alcoholic KOH to a phenolphthalein end-point. The polymers containing from 0.001 to 0.30 chemical equivalents of (—COOH) per 100 parts of rubber are predominantly plastic in nature and are adapted to produce rubbery elastic compositions when condensed with a polyvalent metallic oxide. Polymers containing from 0.02 to 0.20 e. p. h. r. of carboxyl are preferred for the production of elastic polymeric metallo-carboxylates having the best balance of properties while those containing from 0.02 to 0.10 e. p. h. r. of carboxyl are preferred for the production of strong elastic compositions having most excellent low temperature flexibility.

In addition to the two essential types of monomers (that is, the conjugated diene and the olefinically-unsaturated acid), the monomer mixture polymerized may also contain one or more interpolymerizable monoolefinic monomeric materials. Illustrative monoolefinic monomers which may be so interpolymerized include acrylonitrile, alpha-chloroacrylonitrile, the alkyl esters of acrylic and alpha-alkyl acrylic acids such as methyl acrylate, ethyl acrylate, butyl acrylate, 2-ethylhexyl acrylate, n-octyl acrylate, methyl methacrylate, methyl ethacrylate, butyl methacrylate, lauryl methacrylate, and others, styrene, vinylidene chloride, vinyl pyridine, isobutylene and others. Such additional monomeric materials may be considered to be replacements-in-part for either the conjugated diene or the olefinically-unsaturated acid. Tripolymers and other multipolmers having excellent properties when condensed with a polyvalent metallic oxide may be produced from monomeric mixtures containing from 50 to 94% by weight of the conjugated diene (preferably a butadiene-1,3 hydrocarbon), from 1 to 45%, more preferably 2 to 30%, by weight of the unsaturated acid and from 5 to 40% by weight of one or more than one of the monoolefinic monomers.

In preparing the polymers in Step A, monomeric mixtures, as above disclosed, are polymerized in an acidic aqueous medium (that is, in an aqueous medium with a pH below 7) in the presence of a suitable polymerization catalyst. The use of an acidic medium insures the production of a true addition-type polymer containing interpolmerized free acid (—COOH) groups and having a molecular weight sufficiently high to be possessed of rubber-like properties. The acidic aqueous medium may either be emulsifier-free or it may contain an emulsifier adapted for use under acidic conditions. Suitable emulsifiers include hymolal sulfates and sulfonates such as sodium lauryl sulfate, the sodium salts of sulfonated petroleum or paraffin oils, the sodium salts of dodecane-1-sulfonic acid, octadecane-1-sulfonic acid, etc.; aralkyl sulfonates such as sodium isopropyl benzene sulfonate and sodium isobutyl naphthalene sulfonate; alkali metal salts of sulfonated dicarboxylic acid esters and amides such as sodium dioctyl sulfosuccinate, sodium-N-octadecyl-sulfosuccinamate and the like, and others. Much preferred, however, are the so-called cationic emulsifiers such as the salts of strong inorganic acids and organic bases containing long carbon chains, for example, lauryl amine hydrochloride (especially preferred), the hydrochloride of diethylaminoethyloleylamide, trimethyl cetyl ammonium bromide, dodecyl trimethyl ammonium bromide, the diethylcyclohexylamine salt of cetyl sulfuric ester, and others. In addition to the above and other polar or ionic emulsifiers, stable at a pH below 7, still other materials which may be used, singly or in combination with one or more of the above-mentioned types of emulsifiers, include the so-called "non-ionic" emulsifiers (some of which are particularly adapted for use in acidic media) such as the polyether alcohols prepared by condensing ethylene oxide with higher alcohols, the fatty alkylol-amine condensates, the diglycol esters of lauric, oleic, and stearic acids, and others.

The catalyst, required for satisfactory polymerization rate, may be any of those commonly employed for the polymerization of butadiene hydrocarbons including the various peroxygen compounds such as hydrogen peroxide, benzoyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, sodium, potassium and ammonium persulfate and others.

Particularly preferred are the water-soluble peroxygen compounds such as hydrogen peroxide and the sodium, potassium and ammonium persulfates, the water-soluble oxidation-reduction or "redox" types of catalysts, and the heavy-metal activated, water-soluble peroxygen and redox catalysts. Included in this preferred class are the water-soluble persulfates; the combination of one of the water-soluble peroxygen compounds such as potassium persulfate with a reducing substance such as a polyhydroxy phenol, an oxidizable sulfur compound such as sodium bisulfite, sodium sulfite and the like; the combination of a water-soluble peroxygen compound such as potassium persulfate and dimethylaminopropionitrile; the combination of a water-soluble peroxygen compound with a reducing sugar or with a combination of a diazomercapto compound and a water-soluble ferricyanide compound and others. Heavy metal ions which greatly activate potassium persulfate catalyzed and the redox-catalyzed polymerization mediums include those of silver, copper(ic), iron, cobalt, nickel and others.

While the polymerization may be carried out in the presence of air, the rate of reaction is ordinarily faster in the absence of oxygen and hence polymerization in an evacuated vessel or under an inert atmosphere such as nitrogen is preferred. The temperature at which the polymerization is carried out is not critical, it may be varied widely from −30° to 100° C. or higher, though best results are generally obtained at a temperature of about 0° C. to about 70° C.

In order to minimize variation in the rate of reaction and to maintain a given proportion of each of the two essential monomers in the reaction mixture throughout the polymerization reaction (and thereby improve also the homogeneity of the product and insure incorporation of a desired amount of free (—COOH) groups in the polymer molecules) it is sometimes desirable to introduce the acid (or mixture of acid and monoolefinic monomer) gradually during the course of the reaction. By the latter method, which is well understood by the art, it is possible to obtain efficient interpolymerization of the olefinically-unsaturated acid.

Other polymerization techniques and practices conventionally employed in the preparation of butadiene styrene and butadiene acrylonitrile synthetic rubbers may also be used in polymerizing the monomer mixtures herein described. For example, the use of mercaptan modifiers in the reaction mixture is often desirable and results in lower raw polymer viscosity and other allied plastic properties, although the modifiers such as the primary, secondary and tertiary aliphatic mercaptans containing from 4 to 16 carbon atoms appear to have a greater modifying efficiency in the diene-acid system of this invention than in the polymerization of the conventional synthetic rubbers such as the butadiene acrylonitrile or butadiene styrene copolymer rubbers. Still other substances which desirably may be incorporated in the reaction medium include acidic buffers, electrolyte salts, carbon black and others in a manner well understood by the art. Moreover, the polymerization may be terminated, as by addition of a polymerization inhibitor hydroquinone or phenyl beta naphthylamine, before conversion of the monomer to polymer is complete. The higher the conversion, everything else being equal, the higher the gel or insoluble content of the polymer. Polymers prepared by stopping the reaction at 50 to 90% conversion are more plastic, more soluble, and are possessed of as good or better tensile strength than the polymers prepared at substantially complete conversion.

The polymers of this invention are obtained from the acidic aqueous medium either as a crude but filterable dispersion or a flocculent precipitate (from emulsifier-free media) or as an acidic aqueous polymer dispersion or latex. Isolation of the flocculent polymers involves only filtration and washing with dilute mineral or organic acid solutions so as to remove catalyst and buffer residues while coagulation of the acidic latex is preferably effected so as not to impair or destroy the free carboxyl groups of the polymer. This may be accomplished by admixing the latex with a dilute (ca. 3–15%) hydrochloric, sulfuric or acetic acid solution, or an alcohol such as ethyl alcohol, or a combination of salt (NaCl) and alcohol, or by a dilute (ca. 1 to 30%) acidic aqueous solution of a polyvalent metal salt of a strong acid such as calcium chloride, calcium nitrate, zinc chloride, alum and others. Calcium chloride solution (ca. 1–30%) slightly acidified with HCl will efficiently coagulate the diene-acid interpolymers whether the latex is added to the coagulant or vice versa.

Step B in the process of this invention is performed by admixing the plastic rubbery carboxyl-containing polymer with a polyvalent metallic oxide in any conventional manner such as by mill-mixing, in a Banbury-type internal mixer, by mixing an aqueous dispersion of the metallic oxide with the latex and precipitating the mixed dispersion, and the like. The intermixture of the polymer and rubber should be performed at moderate working temperatures, that is below mill roll temperatures of about 275° F., in order to avoid "scorching" of the stock. The mastication of the mixture should be continued until the resulting mixture is homogeneous with the metallic oxide well dispersed in the rubber. Softeners, plasticizers, milling acids etc., may be utilized to facilitate the mixing step. In any case, the resulting intermixture should be plastic, workable, and homogeneous.

The polyvalent metallic oxides which may be utilized in Step B are those of zinc (preferred), magnesium, cadmium, calcium, titanium, aluminum, barium, strontium, copper(ic), cobalt(ic), tin and others. Specifically, zinc oxide, calcium oxide, cadmium oxide (CdO), magnesium oxide (MgO), dibutyl tin oxide, lead oxide (PbO), barium oxide (BaO), cobalt oxide ($Co_2O_3$), tin oxide (SnO), strontium oxide (SrO), and others produce superior results and are preferred. In addition, various polyvalent metallic hydroxides, which in reality are hydrated polyvalent metallic oxides and upon heating or reaction with polymer carboxyl (—COOH) groups readily split off water, such as calcium hydroxide, cadmium hydroxide [$Cd(OH)_2$], zinc hydroxide, barium hydroxide and others also are utilizable to produce excellent, strongly elastic polymeric metallo-carboxylates.

The proportions of polyvalent metallic oxide required for efficient cure of applicant's compositions will vary, of course, depending on the curing agent itself, on the interpolymerized acid content (or —COOH content) of the polymer and on the fineness and compatibility of the metallic oxide with the rubber. Amounts of metallic oxide chemically equivalent to ½ the carboxyl content of the polymer produce strongly elastic polymeric metallo-carboxylates. For optimum results, the amount of curing agent should be at least equivalent chemically to the —COOH content of the polymer. Substantially chemical equivalent amounts of a metallic oxide such as zinc, calcium or cadmium oxide, for example, produce transparent pure gum compositions while excess metallic oxide produces opaque compositions. Since excess curing agent does not have an adverse effect on the elastic properties it is generally preferred, when it is not desired to produce a transparent composition, to utilize amounts of curing agent in excess of stoichiometrical proportions and preferably twice or more stoichiometrical amounts. Generally, however, amounts of a curing agent such as zinc oxide varying from 1 to 30% based on the weight of polymer will be found sufficient with amounts from 4 to 20% by weight based on the dry weight of polymer being preferred.

The polymeric condensation or condensation polymerization reaction occurring in Step C of the process of this invention is a reaction which occurs with greater ease than, for example, the reaction involved in sulfur vulcanization of unsaturated polymeric materials. It will occur to a certain extent upon long standing at room temperature but, however, since most manufacturing processes require shorter curing cycles, it is generally desirable to heat the metallic oxide containing polymer composition to cause the polymer to flow and coalesce and to insure efficient distribution or solubilization of the oxide through the composition. For the latter reasons, it is generally preferred to heat the plastic metallic oxide polymer composition at temperatures varying from 125 to 400° F. with best results being obtained by heating at temperatures of 150 to 350° F. Below 125° F. the condensation reaction is slow and above 400° F. excessive blowing and pitting of the composition occurs. The condensation reaction will generally be complete in from 5 or 10 minutes to as long as 2 hours at temperatures of 125 to 400° F. Further heating at these temperatures, while it does not cause breakdown of the metallo-carboxylate, does not produce a significant increase in physical properties and accordingly is not preferred.

The preparation of typical rubbery interpolymers according to this invention and the properties thereof will be more clearly described in the following specific examples which are intended merely as illustrations of the invention and not as limitations on the scope thereof.

EXAMPLE 1

A mixture of 200 parts by weight of water and 5 parts by weight of dodecylamine is prepared and sufficient hydrochloric acid added thereto to neutralize 90% of the amine. To this solution is added 0.4 part by weight of t-dodecyl mercaptan (aqueous emulsion), 0.2 part by weight of potassium persulfate, and 0.2 part by weight of aluminum chloride. The reaction vessel is then sealed and evacuated, the vacuum broken by the addition of a mixture of 91.4 parts by weight of butadiene-1,3 and 8.6 parts by weight of methacrylic acid, and the reaction vessel and its contents heated to 50° C. with constant agitation. Polymerization is terminated after 6 hrs. at 50° C. by the addition of 0.1% hydroquinone based on the monomers charged. At the latter point the polymerization reaction is approximately 73% complete. The finished latex is then stabilized against oxidation by the addition of an aqueous slurry containing 1.5% by weight based on the polymer of phenyl beta-naphthylamine (in the form of a 3% solution of phenyl beta-naphthylamine in ethyl alcohol, converted to a slurry by addition of water). The latex-stabilizer mixture is agitated until a smooth uniform mixture results.

Coagulation of the latex is performed, for example, by addition of 1% by weight of sodium chloride to flocculate the latex followed by the addition of ethyl alcohol. The coagulum is filtered and washed several times with 1 to 3% hydrochloric acid solution to free the coagulum of residual traces of dodecylamine and then washed with clear water until $Cl^-$ free. The washed coagulum is then dried in an air oven at 55° C. The dried crumbs are placed upon a moderately warm rubber mill and formed into sheets. The theoretical carboxyl or (—COOH)

content in the polymer is 0.137 chemical equivalents per 100 parts of rubber. By dissolving the polymer in benzene and titrating with KOH to a phenolphthalein endpoint, it is found that the actual (—COOH) content of the polymer is 0.1102 equivalents per 100 parts of rubber ( e. p. h. r.), an amount corresponding to 9.5% interpolymerized methacrylic acid. The polymer is possessed of an intrinsic viscosity of 1.31.

The polymer of Example 1 is mixed with 10 parts per 100 parts of rubber (p. h. r.) of zinc oxide on a cool rubber mill and then molded for 30 minutes at 280° F. to form a tough, strong, elastic composition, transparent in thin sections, and having an ultimate tensile strength of 5140 lbs./sq. in., a modulus at 300% elongation of 1890 lbs./sq. in. and an ultimate elongation of 380%. Addition of respectively, 15 and 25 parts of zinc oxide per 100 parts of rubber and similarly heating the composition produces successive increases in tensile strength over that of the sample cured with 10 parts of zinc oxide.

EXAMPLE 2

By the method of Example 1 a copolymer is produced from a monomeric mixture comprising 92.8% by weight of butadiene-1,3 and 7.2% by weight of acrylic acid. The polymerization reaction is carried out to a conversion of 68% to produce a copolymer containing 0.044 e. p. h. r. (3.18% acrylic acid in polymer) which is gel free, is possessed of an intrinsic viscosity of 1.18 and a Mooney viscosity using the small rotor after 4 minutes at 212° F. of 30. The polymer is mixed with 12 p. h. r. of zinc oxide and 50 p. h. r. of an easy processing channel black. The resultant mixture is heated for 30 minutes at 280° F. to produce an elastic cured composition having a tensile strength of 3720 lbs./sq. in., a Gehman $T_5$ of $-65°$ C. and a Gehman Fp of $-74°$ C.

EXAMPLE 3

Monomeric mixtures consisting, respectively, of (A) 94% by weight of butadiene-1,3 and 6% by weight of sorbic acid and (B) 90% by weight of butadiene-1,3 and 10% by weight of sorbic acid are polymerized in a medium similar to that of Example 1. Polymerization proceeds in each case to 75% conversion in about 17 hours with the production of an acidic synthetic rubber latex. Coagulation in each case is satisfactorily accomplished by pouring a 15% HCl solution into the agitated latex, followed by several acidic washes, several clear water washes and air drying at 60° C. Copolymer A, which is found to contain 0.04 e. p. h. r. of carboxyl, is mixed with 11.6 parts per 100 parts of rubber (p. h. r.) of zinc oxide and 5 parts of a softener consisting of a complex mixture of paraffinic hydrocarbons known commercially as "Paraflux." Copolymer B, which is found to contain 0.07 e. p. h. r. of carboxyl, is likewise mixed with 5 p. h. r. of zinc oxide and 5 p. h. r. of the same softener. In each case the result is a soft plastic composition which upon molding for 30 minutes at 280° F. is converted to the strong elastic condition. Copolymer A in the latter condition exhibiting a tensile strength of 3530 lbs./sq. in., a 300% modulus of 3140 lbs./sq. in., an elongation of 330%, a Gehman $T_5$ of $-62°$ C. and a Gehman freezing point or temperature (Fp) of $-69°$ C. Copolymer B in the cured or elasticized condition exhibits a tensile strength of 4650 lbs./sq. in., 300% modulus of 4080 lbs./sq. in., elongation of 330%, a Gehman $T_5$ of $-50°$ C. and a Gehman Fp of $-63°$ C. By contrast, a standard butadiene-1,3 styrene copolymer rubber known as "GR-S," when cured in a standard sulfur vulcanization recipe, exhibits a pure gum tensile strength of less than 500 lbs./sq. in. and an elongation of 600–800% while its low temperature flexibility is shown by Gehman $T_5$ of $-33$ to $-38°$ C. and Fp of $-45-48°$ C.

Increasing the sorbic acid content of the monomeric mixture of Example 3 to 11.2% results in a copolymer at 71% conversion which is found to contain 0.087 e. p. h. r. of (COOH) and which when compounded with only 7.0 p. h. r. of zinc oxide and press-molded for 40 minutes at 300° F. possesses the astounding tensile strength of 11,100 lbs./sq. in., a modulus of 1560 lbs./sq. in. and an elongation of 575%. The press-molded sheet of pure gum composition is smooth in appearance.

EXAMPLE 4

In a similar manner a monomeric mixture consisting of 80% butadiene-1,3 and 20% methacrylic acid is polymerized to 94% conversion in a medium similar to that of Example 1. Upon admixture of the copolymer with 5 p. h. r. of zinc oxide and press-molding 30 minutes at 280° F. produces an elastic, transparent pure gum vulcanizate having a tensile strength of 3300 lbs./sq. in., a 300% modulus of 1,000 lbs./sq. in., and an elongation of 565%. Increasing the zinc oxide to 15 p. h. r. more than doubles the tensile strength, triples the 300% modulus and slightly reduces the elongation.

EXAMPLE 5

The following monomeric mixtures are polymerized in a medium similar to that of Example 1:
(1) 90% by weight of butadiene-1,3, 5% acrylonitrile and 5% methacrylic acid.
(2) 88.1% by weight of butadiene-1,3, 5.3% acrylonitrile and 8.6% methacrylic acid.
(3) 70% by weight of butadiene-1,3, 20% acrylonitrile and 10% methacrylic acid.
(4) 67% by weight of butadiene-1,3, 24.4% acrylonitrile and 8.6% methacrylic acid.
(5) 60% by weight of butadiene-1,3, 25% acrylonitrile and 15% methacrylic acid.
(6) 55% by weight of butadiene-1,3, 35% acrylonitrile and 10% methacrylic acid.

Upon admixture with zinc oxide alone and upon being heated for 30 minutes at 300° F., the above tripolymers exhibit the following properties:

Table 1

| Properties | Tripolymer (1) | Tripolymer (2) | Tripolymer (3) | Tripolymer (4) | Tripolymer (5) | Tripolymer (6) |
|---|---|---|---|---|---|---|
| Parts ZnO | 5 | 10 | 10 | 11 | 15 | 11 |
| Tensile (p. s. i.) | 3,600 | 5,600 | 9,700 | 11,000 | 5,150 | 9,960 |
| 300% modulus | 800 | 3,100 | 1,500 | 820 | 5,150 | 1,960 |
| Percent Elongation | 565 | 420 | 580 | 585 | 315 | 500 |
| e. p. h. r. (—COOH) | | 0.142 | | .097 | | 0.13 |

EXAMPLE 6

Mixtures of monomeric materials consisting of (a) 71.5% by weight of butadiene-1,3, 17.3% styrene and 11.2% sorbic acid; (b) 71.5% by weight of butadiene-1,3, 19.9% styrene, and 8.6% methacrylic acid; and (c) 71.5% butadiene-1,3, 21.3% styrene and 7.2% acrylic acid polymerized in a system similar to that of Example 1 in 17 hours at 50° C. to form excellent acidic latices. The tripolymer obtained from mixture (a) contains 0.09 e. p. h. r. of carboxyl and exhibits a small rotor Mooney viscosity after four minutes at 212° F. of 96, that of mixture (b) exhibits a Mooney viscosity of 105 and that of (c) 58. The tripolymers cured with 8 p. h. r. of zinc oxide possess pure gum tensiles ranging from 3,300 to 4,000 lbs./sq. in., elongations of 310 to 435%, and 300% moduli ranging from 2,000 to 3,000 lbs./sq. in. The Gehman $T_5$ and Fp of tripolymer (d) are, respectively, $-25$ and $-42°$ C., that of tripolymer (b) $-12$ and $-31°$ C., and that of tripolymer (c) $-27$ and $-47°$ C.

EXAMPLE 7

A mixture consisting of 94.0 parts of butadiene-1,3 and 6.0 parts of cinnamic acid is polymerized to 93% conversion in a medium similar to that of Example 1 to yield a plastic polymer containing .038 e. p. h. r. of (—COOH) and which exhibits a tensile strength of 2,000 lbs./sq. in. when compounded with 5 p. h. r. of zinc oxide and 50 p. h. r. of carbon black. Further increases in combined cinnamic acid content results in increases in tensile strength and modulus.

EXAMPLE 8

Similarly, substitution of 6.0 parts of the crotonic and itaconic acids for the cinnamic acid of Example 7 in the recipe of Example 1 results in polymers showing good properties when cured with 10 p. h. r. of zinc oxide.

EXAMPLE 9

Monomeric mixtures having the following proportions are polymerized according to the method of Example 1:

Table II

| Monomers | Chemical Equivalents (—COOH) | Percent Conversion | Remarks |
|---|---|---|---|
| Butadiene—82.8%<br>Acrylic Acid—7.2<br>Isooctyl Acrylate—10.0 | 0.07 | 86 | Polymer—56% Gel; Good ZnO cure. |
| Butadiene-1,3—82.8<br>Acrylic Acid—7.2<br>Ethyl Methacrylate—10.0 | 0.041 | 74.5 | Polymer—2% Gel; Good ZnO cure. |
| Butadiene-1,3—67.0<br>Acrylonitrile—19.4<br>Methacrylic acid—8.6<br>Ethyl Acrylate—5.0 | 0.10 | 99 | Good ZnO cure; Tear strength good. |
| Butadiene-1,3—67.0<br>Acrylonitrile—19.4<br>Methacrylic acid—8.6<br>Lauryl methacrylate—5.0 | 0.10 | 99 | Good ZnO cure; Good low temp. flex. |
| 2,3-dimethyl butadiene-1,3—91.4<br>Methacrylic acid—8.6 | 0.100 | 91 | Polymer—3% gel; Good ZnO cure. |
| 2,3-dimethyl butadiene-1,3—67.0<br>Acrylonitrile—24.4<br>Methacrylic acid—8.6 | 0.088 | 98 | Polymer—gel free and very plastic. Good ZnO cure. |
| Isoprene—91.4<br>Methacrylic acid—8.6 | 0.105 | 87.5 | Polymer—75% gel and plastic. Good ZnO cure. |

In each case 12 p. h. r. of ZnO are incorporated in the above-described polymers and the resulting compositions heated for 30 minutes at 300° F. Each polymer produces a strongly elastic, nearly clear gum composition. In general, the substituted butadienes produce softer, more plastic polymers while incorporation of ethyl methacrylate, isooctyl acrylate, ethyl acrylate, and lauryl methacrylate seems to have a modifying action producing polymers having a better balance of modulus and tensile strength than copolymers of a diene and an acid of corresponding acid or (—COOH) content.

EXAMPLE 10

The recipe of Example 1 is utilized in the interpolymerization of monomeric mixtures containing, respectively, 94% by weight of butadiene-1,3 and 6% of various olefinically-unsaturated acids including specifically itaconic acid, crotonic acid, maleic acid, fumaric acid, oleic acid, linoleic acid, ricinoleic acid, and undecylenic acid. In each case the polymerization proceeds to a conversion of from 76 to 98%. When the resultant polymers are compounded with 5 p. h. r. of zinc oxide and 50 p. h. r. of carbon black and heated for 30 minutes at 300° F., elastic compositions are obtained having increased tensile strength as compared to a similarly compounded and cured polybutadiene rubber, and having Gehman $T_5$ values ranging from —47 to —66° C. and Fp values ranging from —74 to —78° C.

EXAMPLE 11

Polymers having the properties desirable in this invention may be made in an acidic, emulsifier-free medium. For example, a mixture of 400 parts of water, 3.0 parts of potassium persulfate and 3.0 parts of sodium bisulfite is prepared, the vessel evacuated and a mixture consisting of 97.4 parts by weight of butadiene-1,3 and 8.6 parts of methacrylic acid added. The mixture is maintained at 50° C. until polymerization of 55% of the monomeric materials has occurred. The flocculent precipitate obtained is filtered, washed several times with 3 volumes of 3% HCl solution and then rinsed with clear water until HCl-free. The portion of the polymer soluble in benzene is found to contain 0.202 e. p. h. r. of (—COOH) corresponding to a methacrylic acid content of 17.37%. Addition of 10 p. h. r. of zinc oxide to the plastic copolymer and press-molding for 30 minutes at 300° F. produces an elastic, clear gum composition having a tensile strength of 7120 lbs./sq. in., 300° modulus of 3920 lbs./sq. in., and an elongation of 435%. Increasing the amount of zinc oxide to 20 p. h. r. and similarly curing the composition results in further increases in tensile strength and modulus.

EXAMPLE 12

A mixture is prepared containing 130 parts of water, 2.0 parts of a sodium alkyl aryl sulfonate known as "Nacconol NRSF," 1.0 part of an alkylated aryl polyether alcohol known as "Triton X–100 or Triton N–100," 0.2 part of ammonium persulfate, 0.5 part of dodecyl mercaptan, and 0.1 part $H_2SO_4$ (or sufficient to adjust to a pH of 3.0). To this mixture a monomeric mixture is added consisting of 70 parts butadiene-1,3, 24 parts of acrylonitrile and 6 parts of methacrylic acid. Reaction reaches 95% conversion in 40 hours at 40° C. with the production of an excellent stable acidic latex containing over 40% total solids. To the latex is added 5.0 p. h. r. (on latex polymer solids) of zinc oxide (added as an aqueous dispersion). A dipping form is first dipped into a 3% aqueous zinc chloride (ZnO free) slurry and then into the latex. A film of coagulant is obtained which is strong in the wet condition. When the wet film is dried and heated under an infrared lamp for 30 minutes a clear, translucent and strongly elastic film is produced having a tensile strength of over 6,000 lbs./sq. in., a 300% modulus of 3850 lbs./sq. in., and an elongation of 375%. The resulting elastic latex film is admirably adapted for use in food packaging, decorative rubber curtains, aprons, tablecloths, etc.

EXAMPLE 13

Separate portions of copolymer similar to that prepared in Example 3, a copolymer prepared by the copolymerization of a monomeric mixture consisting of 94% butadiene-1,3 and 6% sorbic acid, are mixed with 6 p. h. r., respectively, of magnesium oxide, calcium oxide, cadmium oxide, and dibutyl tin oxide, followed by press-molding for 30 minutes at 320° F. In each case strong, elastic and clear pure gum compositions are obtained, the calcium and cadmium oxides producing very "snappy" cured compositions. Six p. h. r. of calcium hydroxide, zinc hydroxide, cadmium hydroxide, and magnesium hydroxide likewise produce elastic compositions of high strength. It therefore appears that the basic polyvalent metallic oxides and hydroxides are excellent curing agents.

Although the invention has been illustrated by the foregoing examples, it is understood that the invention is not limited thereto and that numerous variations and modifications which will be obvious to those skilled in the art are within the spirit and scope of the invention as defined by the appended claims.

I claim:

1. The process of producing an elastic synthetic rubber composition which comprises preparing a plastic polymer of an open-chain aliphatic conjugated diene containing from 4 to 9 carbon atoms, said polymer having from 0.001 to 0.30 chemical equivalents by weight of combined free carboxyl (—COOH) per 100 parts by weight of polymer, mixing said plastic polymer with an amount of a polyvalent metallic oxide chemically equivalent to at least one-half said combined carboxyl, and heating the resulting plastic composition at a temperature of from 125 to 400° F. until salt formation between said polyvalent metallic oxide and the free carboxyl groups of the polymer has occurred and the plastic composition has been converted to an essentially elastic polymeric metallo-carboxylate.

2. The process of producing an elastic synthetic rubber composition which comprises polymerizing in an acidic aqueous medium a mixture of monomeric materials comprising an open-chain aliphatic conjugated diene containing from 4 to 9 carbon atoms and an olefinically-unsaturated carboxylic acid containing at least one activated olefinic carbon-to-carbon double bond, said polymerization being conducted with proportions of said monomeric materials to yield a plastic polymer containing from 0.001 to 0.30 chemical equivalents of combined carboxyl (—COOH) per 100 parts by weight of polymer, mixing said plastic polymer with an amount of a polyvalent metallic oxide chemically equivalent to at least one-half said combined carboxyl, and heating the resulting plastic composition at a temperature of from 125 to 400° F. until salt formation between said polyvalent metallic oxide and the free carboxyl groups of the polymer has occurred and the plastic composition has been converted to an essentially elastic polymeric metallo-carboxylate.

3. The process of claim 2 wherein the polyvalent metallic oxide is selected from the class consisting of zinc oxide, magnesium oxide, calcium oxide, cadmium oxide and dibutyl tin oxide.

4. The process of producing an elastic synthetic rubber composition which comprises polymerizing in an acidic aqueous emulsion a mixture of monomeric materials comprising butadiene-1,3 and an olefinically-unsaturated carboxylic acid containing a terminal methylene $CH_2=C<$ grouping, said polymerization being conducted with proportions of said monomeric materials to yield a plastic polymer containing from 0.02 to 0.2 chemical equivalents of combined carboxyl (—COOH) per 100 parts by weight of polymer, mixing said plastic polymer with an amount of a polyvalent metallic oxide chemically equivalent to at least one-half said combined carboxyl, and heating the resulting plastic composition at a temperature of from 125 to 400° F. until salt formation between said polyvalent metallic oxide and the free carboxyl groups of the polymer has occurred and the plastic composition has been converted to an essentially elastic polymeric metallo-carboxylate.

5. The process of claim 4 wherein the polyvalent metallic oxide is selected from the class consisting of zinc oxide, magnesium oxide, calcium oxide, cadmium oxide and dibutyl tin oxide.

6. The process of producing an elastic synthetic rubber composition which comprises polymerizing in an acidic aqueous emulsion a mixture of monomeric materials comprising a major proportion of butadiene-1,3 and a minor proportion of acrylic acid, said polymerization being conducted with proportions of said monomeric materials to yield a plastic polymer containing from 0.02 to 0.1 chemical equivalents of combined carboxyl (—COOH) per 100 parts by weight of polymer, mixing said plastic polymer with an amount of a polyvalent metallic oxide at least equivalent chemically to said combined carboxyl, and heating the resulting plastic composition at a temperature of from 125 to 400° F. until salt formation between said polyvalent metallic oxide and the free carboxyl groups of the polymer has occurred and the plastic composition has been converted to an essentially elastic polymeric metallo-carboxylate.

7. The process of producing an elastic synthetic rubber composition which comprises polymerizing in an acidic aqueous emulsion a mixture of monomeric materials comprising a major proportion of butadiene-1,3 and a minor proportion of methacrylic acid, said polymerization being conducted with proportions of said monomeric materials to yield a plastic polymer containing from 0.02 to 0.1 chemical equivalents by weight of combined carboxyl (—COOH) per 100 parts by weight of polymer, mixing said plastic polymer with an amount of a polyvalent metallic oxide at least equivalent chemically to said combined carboxyl, and heating the resulting plastic composition at a temperature of from 125 to 400° F. until salt formation between said polyvalent metallic oxide and the free carboxyl groups of the polymer has occurred and the plastic composition has been converted to an essentially elastic polymeric metallo-carboxylate.

8. The process of claim 7 wherein the polyvalent metallic oxide is selected from the class consisting of zinc oxide, magnesium oxide, calcium oxide, cadmium oxide and dibutyl tin oxide.

9. The process of producing an elastic synthetic rubber composition which comprises polymerizing in an acidic aqueous emulsion a mixture of monomeric materials comprising a major proportion of butadiene-1,3 and a minor proportion of sorbic acid, said polymerization being conducted with proportions of said monomeric materials to yield a plastic polymer containing from 0.02 to 0.1 chemical equivalents by weight of combined carboxyl (—COOH) per 100 parts by weight of the polymer, mixing said plastic polymer with an amount of a polyvalent metallic oxide at least equivalent chemically to said combined carboxyl, and heating the resulting plastic composition at a temperature of from 125 to 400° F. until salt formation between said polyvalent metallic oxide and the free carboxyl groups of the polymer has occurred and the plastic composition has been converted to an essentially elastic polymeric metallo-carboxylate.

10. The process of producing an elastic synthetic rubber composition which comprises polymerizing in an acidic aqueous emulsion a mixture of monomeric materials consisting of 50 to 94% by weight of butadiene-1,3, 1 to 45% by weight of methacrylic acid, and from 5 to 40% by weight of acrylonitrile, said polymerization being conducted so as to yield a plastic polymer containing from 0.001 to 0.30 chemical equivalents by weight of combined carboxyl (—COOH) per 100 parts by weight of polymer, mixing said plastic polymer with an amount of a polyvalent metallic oxide at least equivalent chemically to said combined carboxyl, and heating the resulting plastic composition at a temperature of from 125 to 400° F. until salt formation between said polyvalent metallic oxide and the free carboxyl groups of the polymer has occurred and the plastic composition has been converted to an essentially elastic polymeric metallo-carboxylate.

11. The process of producing an elastic synthetic rubber composition which comprises polymerizing in an acidic aqueous emulsion a mixture of monomeric materials consisting of from 50 to 94% by weight of butadiene-1,3, from 1 to 45% by weight of acrylic acid, and from 5 to 40% by weight of styrene, said polymerization being conducted as to yield a plastic polymer containing from 0.001 to 0.30 chemical equivalents by weight of combined carboxyl (—COOH) per 100 parts by weight of polymer, mixing said plastic polymer with an amount of a polyvalent metallic oxide at least equivalent chemically to said combined carboxyl, and heating the resulting plastic composition at a temperature of from 125 to 400° F. until salt formation between said polyvalent metallic oxide and the free carboxyl groups of the polymer has occurred and the plastic composition has been converted to an essentially elastic polymeric metallo-carboxylate.

12. An elastic polymeric composition comprising a polymeric metallo-carboxylate deriving a substantial proportion of its elastic properties from the presence in its structure of

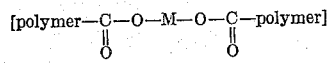

linkages, wherein M is a polyvalent metal atom, formed by a polymeric condensation reaction between the plastic polymer of an open-chain aliphatic conjugated diene containing from 4 to 9 carbon atoms, said polymer containing from 0.001 to 0.30 chemical equivalent by weight of combined carboxyl (—COOH) per 100 parts by weight of polymer, and the metallic cation of a polyvalent metallic oxide chemically equivalent to at least one-half said combined carboxyl.

13. The elastic polymeric composition of claim 12 wherein the polyvalent metallic oxide is selected from the class consisting of zinc oxide, magnesium oxide, calcium oxide, cadmium oxide and dibutyl tin oxide.

14. An elastic polymeric composition comprising a polymeric metallo-carboxylate deriving a substantial proportion of its elastic properties from the presence in its structure of

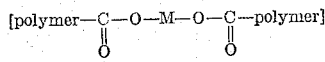

linkages, wherein M is a polyvalent metal atom, formed by a polymeric condensation reaction between a plastic polymer formed by the polymerization in an acidic aqueous medium of a mixture of monomeric materials comprising an open-chain aliphatic conjugated diene containing from 4 to 9 carbon atoms and an olefinically-unsaturated carboxylic acid containing at least one activated olefinic carbon-to-carbon double bond, said plastic polymer containing from 0.02 to 0.2 chemical equivalent by weight per 100 parts by weight of polymer of combined carboxyl (—COOH), and the metallic cation of a polyvalent metallic oxide chemically equivalent to at least one-half said combined carboxyl.

15. An elastic polymeric composition comprising a polymeric metallo-carboxylate deriving a substantial proportion of its elastic properties from the presence in its structure of

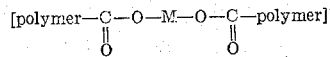

linkages, wherein M is a polyvalent metal atom, formed by a polymeric condensation reaction between a plastic polymer formed by the polymerization in an acidic aqueous emulsion of a mixture of monomeric materials comprising a butadiene-1,3 hydrocarbon and an olefinically-unsaturated carboxylic acid containing at least one activated carbon-to-carbon double bond, said plastic polymer containing from 0.02 to 0.2 chemical equivalent by weight of combined carboxyl (—COOH) per 100 parts by weight of plastic polymer, and the metallic cation of a polyvalent metallic oxide chemically equivalent to at least one-half said combined carboxyl.

16. An elastic polymeric composition comprising a polymeric metallo-carboxylate deriving a substantial proportion of its elastic properties from the presence in its structure of

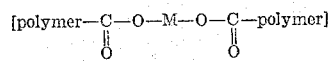

linkages, wherein M is a polyvalent metal atom, formed by a polymeric condensation reaction between a plastic polymer formed by the polymerization in an acidic aqueous emulsion of a monomeric mixture comprising butadiene-1,3 and an olefinically-unsaturated carboxylic acid in which at least one olefinic double bond is in the alpha-beta position with respect to the carboxyl group, said plastic polymer containing from 0.02 to 0.2 chemical equivalent by weight of combined free carboxyl (—COOH) per 100 parts by weight of polymer, and the metallic cation of a polyvalent metallic oxide chemically equivalent to at least one-half said combined carboxyl.

17. An elastic polymeric composition comprising a polymeric metallo-carboxylate deriving a substantial proportion of its elastic properties from the presence in its structure of

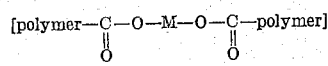

linkages, wherein M is a polyvalent metal atom, formed by a polymeric condensation reaction between a plastic polymer formed by the polymerization in an acidic aqueous emulsion of a mixture of monomeric materials comprising butadiene-1,3 and acrylic acid, said plastic polymer containing from 0.02 to 0.10 chemical equivalent by weight of combined free carboxyl (—COOH) per 100 parts by weight of polymer, and the metallic cation of a polyvalent metallic oxide chemically equivalent to at least said combined carboxyl.

18. The elastic polymeric composition of claim 17 wherein the polyvalent metallic oxide is selected from the class consisting of zinc oxide, magnesium oxide, calcium oxide, cadmium oxide and dibutyl tin oxide.

19. An elastic polymeric composition comprising a polymeric metallo-carboxylate deriving a substantial proportion of its elastic properties from the presence in its structure of

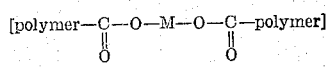

linkages, wherein M is a polyvalent metal atom, formed by a polymeric condensation reaction between a plastic polymer formed by the polymerization in an acidic aqueous emulsion of a mixture of monomeric materials comprising butadiene-1,3 and methacrylic acid, said plastic polymer containing from 0.02 to 0.10 chemical equivalent by weight of combined free carboxyl (—COOH) per 100 parts by weight of polymer, and the metalic cation of a polyvalent metallic oxide chemically equivalent to at least said combined carboxyl.

20. The elastic polymeric composition of claim 19 wherein the polyvalent metallic oxide is selected from the class consisting of zinc oxide, magnesium oxide, calcium oxide, cadmium oxide and dibutyl tin oxide.

21. An elastic polymeric composition comprising a polymeric metallo-carboxylate deriving a substantial proportion of its elastic properties from the presence in its structure of

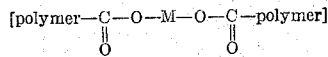

linkages, wherein M is a polyvalent metal atom, formed by a polymeric condensation reaction between a plastic polymer formed by the polymerization in an acidic aqueous emulsion of a mixture of monomeric materials comprising butadiene-1,3 and sorbic acid, said plastic polymer containing from 0.02 to 0.1 chemical equivalent by weight of combined free carboxyl (—COOH) per 100 parts by weight of polymer, and the metallic cation of a polyvalent metallic oxide chemically equivalent to at least said combined carboxyl.

22. An elastic polymeric composition comprising a polymeric metallo-carboxylate deriving a substantial proportion of its elastic properties from the presence in its structure of

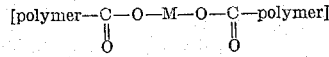

linkages, wherein M is a polyvalent metal atom, formed by a polymeric condensation reaction between a plastic polymer formed by the polymerization in an acidic aqueous emulsion of a mixture of monomeric materials consisting of from 50 to 94% by weight of butadiene-1,3, from 1 to 45% by weight of acrylic acid, and from 5 to 40% by weight of styrene, said plastic polymer containing from 0.001 to 0.30 chemical equivalent by weight of combined free carboxyl (—COOH) per 100 parts by weight of polymer, and the metallic cation of a polyvalent metallic oxide chemically equivalent to at least said combined carboxyl.

23. An elastic polymeric composition comprising a polymeric metallo-carboxylate deriving a substantial proportion of its elastic properties from the presence in its structure of

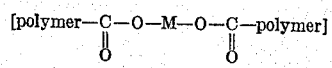

linkages, wherein M is a polyvalent metal atom, formed by a polymeric condensation reaction between a plastic polymer formed by the polymerization in an acidic aqueous emulsion of a mixture of monomeric materials consisting of from 50 to 94% by weight of butadiene-1,3, from 1 to 45% by weight of methacrylic acid, and from 5 to 40% by weight of acrylonitrile, said plastic polymer containing from 0.001 to 0.30 chemical equivalent by weight of combined free carboxyl (—COOH) per 100 parts by weight of polymer, and the metallic cation of a polyvalent metallic oxide chemically equivalent to at least said combined carboxyl.

24. The elastic polymeric composition of claim 23 wherein the polyvalent metallic oxide is selected from the class consisting of zinc oxide, magnesium oxide, calcium oxide, cadmium oxide and dibutyl tin oxide.

References Cited in the file of this patent

UNITED STATES PATENTS

| | | |
|---|---|---|
| 2,234,204 | Starkweather et al. | Mar. 11, 1941 |
| 2,380,356 | Youker | July 10, 1945 |
| 2,604,668 | Miller et al. | July 29, 1952 |